US011342586B2

United States Patent
Kim et al.

(10) Patent No.: US 11,342,586 B2
(45) Date of Patent: May 24, 2022

(54) RECHARGEABLE LITHIUM BATTERY

(71) Applicant: SAMSUNG SDI CO., LTD., Yongin-si (KR)

(72) Inventors: Yunhee Kim, Yongin-si (KR); Kyoung Soo Kim, Yongin-si (KR); Taejeong Kim, Yongin-si (KR); Dohyung Park, Yongin-si (KR); Yongchan You, Yongin-si (KR); Erang Cho, Yongin-si (KR); Sun-Joo Choi, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 122 days.

(21) Appl. No.: 16/113,254

(22) Filed: Aug. 27, 2018

(65) Prior Publication Data

US 2019/0074546 A1  Mar. 7, 2019

(30) Foreign Application Priority Data

Sep. 5, 2017 (KR) .................. 10-2017-0113339

(51) Int. Cl.
*H01M 10/0567* (2010.01)
*H01M 4/525* (2010.01)
*H01M 10/0525* (2010.01)
*H01M 10/052* (2010.01)
*H01M 4/505* (2010.01)
*H01M 4/02* (2006.01)

(52) U.S. Cl.
CPC ....... *H01M 10/0567* (2013.01); *H01M 4/505* (2013.01); *H01M 4/525* (2013.01); *H01M 10/052* (2013.01); *H01M 10/0525* (2013.01); *H01M 2004/028* (2013.01); *H01M 2300/004* (2013.01); *H01M 2300/0025* (2013.01)

(58) Field of Classification Search
CPC .... H01M 4/505; H01M 4/525; H01M 10/052; H01M 10/0525; H01M 10/0567; H01M 2004/028; H01M 2300/0025; H01M 2300/004
See application file for complete search history.

(56) References Cited

U.S. PATENT DOCUMENTS

| | | | |
|---|---|---|---|
| 6,783,896 B2 | 8/2004 | Tsujioka et al. | |
| 7,223,502 B2 * | 5/2007 | Onuki ............... | H01M 10/0525 252/62.2 |

(Continued)

FOREIGN PATENT DOCUMENTS

| CN | 1653641 A | 8/2005 |
|---|---|---|
| CN | 1822423 A | 8/2006 |
| CN | 101388475 A | 3/2009 |
| CN | 102082292 A | 6/2011 |
| CN | 104396080 A | 3/2015 |
| CN | 104600362 A | 5/2015 |
| CN | 104810551 A | 7/2015 |
| CN | 104979588 A | 10/2015 |
| CN | 105845980 A | 8/2016 |

(Continued)

OTHER PUBLICATIONS

Extended European Search Report dated Feb. 5, 2019, of the corresponding European Patent Application No. 18182841.9.

(Continued)

*Primary Examiner* — Anca Eoff
(74) *Attorney, Agent, or Firm* — Lee IP Law, P.C.

(57) ABSTRACT

A rechargeable lithium battery including a negative electrode; a positive electrode including a positive active material; and a non-aqueous electrolyte, wherein the non-aqueous electrolyte includes a non-aqueous organic solvent, a lithium salt, a first additive including a compound represented by one of Chemical Formulae 1 to 4 and a second additive including a compound represented by Chemical Formula 5 or Chemical Formula 6, or a combination thereof, the positive active material includes a compound that includes about 70 mol % or greater of Ni based on the total mole number of all metal elements except for Li,

[Chemical Formula 1]
$$R^2-\underset{\underset{R^3}{|}}{\overset{\overset{R^1}{|}}{Si}}-O-\underset{\underset{O}{\|}}{\overset{\overset{O}{\|}}{S}}-O-\underset{\underset{R^4}{|}}{\overset{\overset{R^6}{|}}{Si}}-R^5$$

[Chemical Formula 2]
$$CX_3SO_3-\underset{\underset{R^7}{|}}{\overset{\overset{R^8}{|}}{Si}}-CX_3SO_3$$

[Chemical Formula 3]
$$R^9-\underset{\underset{O}{\|}}{\overset{\overset{O}{\|}}{S}}-O-Si(C_{m1}H_{2m1+1})_3$$

[Chemical Formula 4]
$$C_nX_{2n+1}-\underset{\underset{O}{\|}}{\overset{\overset{O}{\|}}{S}}-O-Si(C_{m2}H_{2m2+1})_3$$

[Chemical Formula 5]

$$Li^+ \left[ \begin{array}{c} O \\ \diagdown \\ O \end{array} \underset{O}{\overset{O}{\diagup}} \underset{\diagdown}{\overset{\diagup}{P}} \begin{array}{c} R_g \\ R_h \\ R_i \\ R_j \end{array} \right]$$

[Chemical Formula 6]

$$Li^+ \left[ \begin{array}{c} O \\ \diagdown \\ O \end{array} \underset{O}{\overset{O}{\diagup}} \underset{\diagdown}{\overset{\diagup}{B}} \begin{array}{c} R_k \\ R_p \end{array} \right]$$

2 Claims, 1 Drawing Sheet

(56) References Cited

U.S. PATENT DOCUMENTS

| | | |
|---|---|---|
| 7,241,536 B2 | 7/2007 | Kim et al. |
| 9,350,048 B2 | 5/2016 | Kwak et al. |
| 9,472,830 B2 | 10/2016 | Ahn et al. |
| 9,934,911 B2 | 4/2018 | Shimamoto et al. |
| 2002/0197537 A1 | 12/2002 | Kim et al. |
| 2005/0118512 A1 | 6/2005 | Onuki et al. |
| 2006/0240327 A1* | 10/2006 | Xu ............... H01M 10/0525 429/324 |
| 2008/0193852 A1 | 8/2008 | Murai |
| 2009/0068565 A1 | 3/2009 | Lee |
| 2015/0086880 A1 | 3/2015 | Ahn et al. |
| 2015/0171476 A1* | 6/2015 | Onozaki ......... H01M 10/0567 429/332 |
| 2016/0064775 A1* | 3/2016 | Kako ................. H01M 4/505 429/199 |
| 2016/0164142 A1 | 6/2016 | Garsuch et al. |
| 2016/0248121 A1* | 8/2016 | Uematsu ......... H01M 10/0525 |
| 2016/0322669 A1* | 11/2016 | Sawa ............. H01M 10/0567 |
| 2017/0222268 A1 | 8/2017 | Abe et al. |

FOREIGN PATENT DOCUMENTS

| | | |
|---|---|---|
| CN | 106299324 A | 1/2017 |
| CN | 106471664 A | 3/2017 |
| CN | 106898817 A | 6/2017 |
| CN | 107069094 A | 8/2017 |
| CN | 107093766 A | 8/2017 |
| EP | 1 109 244 A2 | 6/2001 |
| JP | 2004-134232 A | 4/2004 |
| JP | 2006-244739 A | 9/2006 |
| JP | 2016-197508 A | 11/2016 |
| KR | 10-2004-0107549 A | 12/2004 |
| KR | 10-2014-0020328 A | 2/2014 |
| KR | 10-2014-0147038 A | 12/2014 |
| KR | 10-2015-0139847 A | 12/2015 |
| KR | 10-2016-0058089 A | 5/2016 |
| KR | 10-1649133 B1 | 6/2016 |
| WO | WO 2012/170688 A2 | 12/2012 |

OTHER PUBLICATIONS

Chinese Search Report/Office action dated Jan. 13, 2021 and dated Jan. 27, 2021.

Chinese Office action dated Jul. 8, 2021.

Chinese Office action dated Oct. 11, 2021.

\* cited by examiner

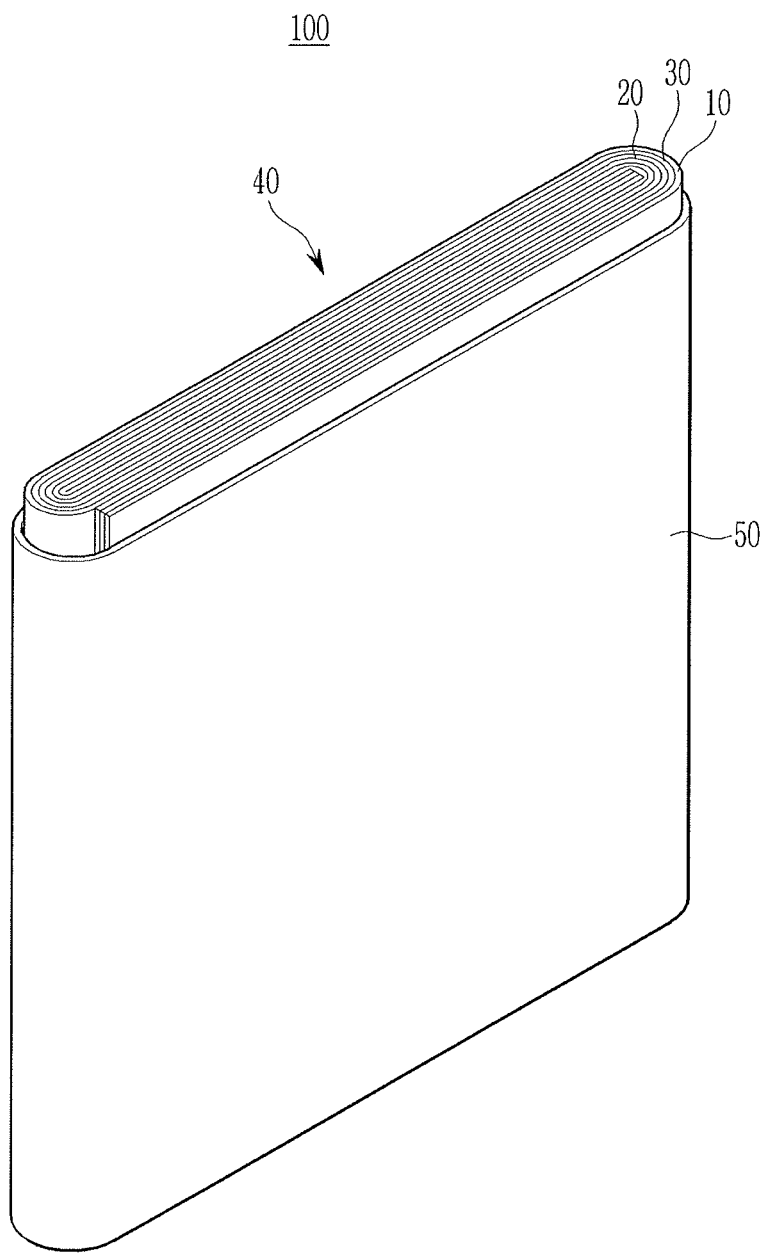

RECHARGEABLE LITHIUM BATTERY

CROSS-REFERENCE TO RELATED APPLICATION

Korean Patent Application No. 10-2017-0113339, filed on Sep. 5, 2017, in the Korean Intellectual Property Office, and entitled: "Rechargeable Lithium Battery," is incorporated by reference herein in its entirety.

BACKGROUND

1. Field

Embodiments relate to a rechargeable lithium battery.

2. Description of the Related Art

A portable information device such as a cell phone, a laptop, smart phone, and the like or an electric vehicle may use a rechargeable lithium battery having high energy density and easy portability as a driving power source. A rechargeable lithium battery may be manufactured by using materials capable of reversibly intercalating and deintercalating lithium ions as a positive active material and a negative active material and filling an electrolyte between the positive electrode and the negative electrode.

SUMMARY

The embodiments may be realized by providing a rechargeable lithium battery including a negative electrode; a positive electrode including a positive active material; and a non-aqueous electrolyte, wherein the electrolyte includes a non-aqueous organic solvent, a lithium salt, a first additive including a compound represented by one of Chemical Formulae 1 to 4, and a second additive including a compound represented by Chemical Formula 5 or Chemical Formula 6, or a combination thereof, the positive active material includes a compound that includes about 70 mol % or greater of Ni based on the total mole number of all metal elements except for Li,

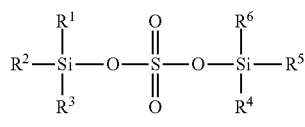
[Chemical Formula 1]

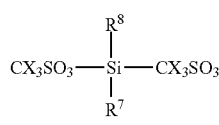
[Chemical Formula 2]

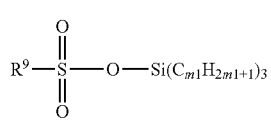
[Chemical Formula 3]

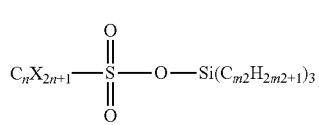
[Chemical Formula 4]

wherein, in Chemical Formula 1 to 4, $R^1$ to $R^9$ are each independently a primary, secondary, or tertiary alkyl group, an alkenyl group, or an aryl group, each X is independently hydrogen or a halogen atom, n is an integer ranging from 0 to 3, and m1 and m2 are each independently an integer ranging from 0 to 3,

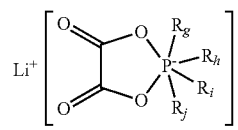
[Chemical Formula 5]

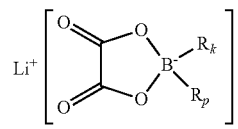
[Chemical Formula 6]

wherein, in Chemical Formulae 5 and 6, $R_g$, $R_h$, $R_i$, and $R_j$ are each independently a halogen; an unsubstituted alkyl group, or a halogen-substituted alkyl group, or at least two of $R_g$, $R_h$, $R_i$, and $R_j$ are linked to form an oxalate group, and $R_k$ and $R_p$ are each independently a halogen; an unsubstituted alkyl group, or a halogen-substituted alkyl group, or $R_k$ and $R_p$ are linked to form an oxalate group.

The first additive may be included in the electrolyte in an amount of about 0.1 wt % to about 7 wt %, based on a total weight of the electrolyte.

The first additive may be included in the electrolyte in an amount of about 0.5 wt % to about 5 wt %, based on a total weight of the electrolyte.

The second additive may be included in the electrolyte in an amount of about 0.1 wt % to about 10 wt %, based on a total weight of the electrolyte.

The second additive may be included in the electrolyte in an amount of about 0.5 wt % to about 7 wt %, based on a total weight of the electrolyte.

A weight ratio of the first additive to the second additive in the electrolyte may be about 3:1 to about 1:3.

The first additive may include bis(triethylsilyl) sulfate, bis(trimethylsilyl) sulfate, di-t-butylsilylbis(trifluoromethane sulfonate), trimethylsilyl methane sulfonate, trimethylsilyl ethane sulfonate, trimethylsilyl benzene sulfonate, trimethylsilyl trifluoromethane sulfonate, triethylsilyl trifluoromethane sulfonate, or a combination thereof.

The second additive may include lithium difluorobis(oxalato)phosphate, lithium tetrafluoro(oxalato)phosphate, lithium tris(oxalato)phosphate, lithium difluoro(oxalato)borate, lithium bis(oxalato)borate, or a combination thereof.

The compound including about 70 mol % or greater of Ni may be represented by Chemical Formula 7:

$$Li_aNi_xCo_yM'_zO_2$$ [Chemical Formula 7]

wherein, in Chemical Formula 7, 0.9≤a≤1.1, 0.7≤x≤0.98, 0<y≤0.3, 0<z≤0.3, x+y+z=1, and M' is Mn or Al.

BRIEF DESCRIPTION OF THE DRAWING

Features will be apparent to those of ordinary skill in the art by describing in detail exemplary embodiments with reference to the attached drawing in which:

The FIGURE illustrates a schematic view showing a rechargeable lithium battery according to an example embodiment of this disclosure.

DETAILED DESCRIPTION

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout. As used herein, the term "or" is not an exclusive term.

In addition, unless explicitly described to the contrary, the word "comprise" and variations such as "includes," "including," "comprises" or "comprising", will be understood to imply the inclusion of stated elements but not the exclusion of any other elements.

A rechargeable lithium battery according to an embodiment of this disclosure includes a positive electrode, a negative electrode, and a non-aqueous electrolyte.

Hereinafter, a rechargeable lithium battery according to an embodiment is described with reference to the FIGURE.

The FIGURE illustrates a schematic view showing a rechargeable lithium battery according to an embodiment of this disclosure.

Referring to the FIGURE, a rechargeable lithium battery 100 according to an embodiment of this disclosure may include an electrode assembly 40 and a case 50 housing the same.

The electrode assembly 40 may include a positive electrode 10, a negative electrode 20, a separator 30 between the positive electrode 10 and the negative electrode 20, and a non-aqueous electrolyte impregnated in the positive electrode 10, the negative electrode 20, and the separator 30.

In an implementation, the non-aqueous electrolyte may include a non-aqueous organic solvent, a lithium salt, a first additive including a compound represented by one of Chemical Formulae 1 to 4, and a second additive including a compound represented by Chemical Formula 5 or Chemical Formula 6, or a combination thereof.

[Chemical Formula 1]
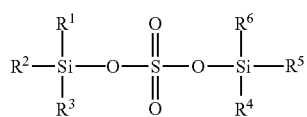

[Chemical Formula 2]
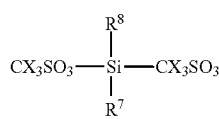

[Chemical Formula 3]
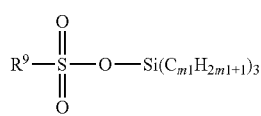

[Chemical Formula 4]
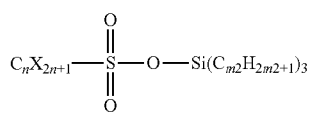

In Chemical Formulae 1 to 4, $R^1$ to $R^9$ may each independently be or include, e.g., an alkyl group, an alkenyl group, or an aryl group. In an implementation, $R^1$ to $R^9$ may each independently be or include, e.g., a primary, secondary, or tertiary alkyl group, an alkenyl group, or an aryl group. Each X may independently be or include, e.g., hydrogen or a halogen atom. n may be, e.g., an integer ranging from 0 to 3. m1 and m2 may each independently be, e.g., an integer ranging from 0 to 3.

In an implementation, the alkyl group may be, e.g., a C1 to C9 alkyl group. In an implementation, the alkenyl group may be, e.g., a C2 to C9 alkenyl group. In an implementation, the aryl group may be, e.g., a C6 to C12 aryl group.

In an implementation, the alkyl group, alkenyl group, aryl group may be an alkyl group, an alkenyl group, and aryl group substituted with, e.g., a halogen atom (such as fluorine), an alkoxy group (such as a methoxy group), a cyano (—CN) group, an isocyanate (—NCO) group, or an isothiocyatate (—NCS) group.

The halogen atom may include, e.g., F, Cl, Br, I, or a combination thereof.

[Chemical Formula 5]
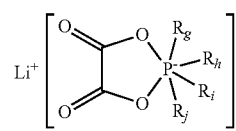

[Chemical Formula 6]
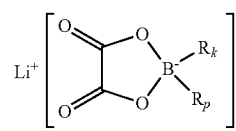

In Chemical Formulae 5 and 6, $R_g$, $R_h$, $R_i$, and $R_j$ may each independently be or include, e.g., a halogen; an unsubstituted alkyl group, or a halogen-substituted alkyl group. In an implementation, at least two of $R_g$, $R_h$, $R_i$, and $R_j$ may be linked to form an oxalate group (e.g., may be carbon and oxygen containing groups arranged and bonded in such a way as to form another oxalate group). $R_k$ and $R_p$ may each independently be or include, e.g., a halogen; an unsubstituted alkyl group, or a halogen-substituted alkyl group. In an implementation, $R_k$ and $R_p$ may be linked to form an oxalate group.

In an implementation, the alkyl group may be, e.g., a C1 to C5 alkyl group. In an implementation, the halogen may include, e.g., F, Cl, Br, I, or a combination thereof.

In an implementation, the first additive may include, e.g., bis(triethylsilyl) sulfate, bis(trimethylsilyl) sulfate, di-t-butylsilylbis(trifluoromethane sulfonate), trimethylsilyl methane sulfonate, trimethylsilyl ethane sulfonate, trimethylsilyl benzene sulfonate, trimethylsilyl trifluoromethane sulfonate, triethylsilyl trifluoromethane sulfonate, or a combination thereof.

In an implementation, the second additive may include, e.g., lithium difluorobis(oxalato)phosphate, lithium tetrafluoro(oxalato)phosphate, lithium tris(oxalato)phosphate, lithium difluoro(oxalato)borate, lithium bis(oxalato)borate, or a combination thereof.

When the non-aqueous electrolyte of the present embodiment includes a compound represented by Chemical Formula 1 as a first additive and a compound represented by Chemical Formula 5 as a second additive, a rechargeable lithium battery having improved cycle-life at ambient (e.g., room) temperature and high temperature may be effectively realized.

In an implementation, the first additive may be included in the electrolyte in an amount of about 0.1 wt % to about 7 wt %, e.g., about 0.5 wt % to about 5 wt %, based on a total weight of the electrolyte. When the first additive is included in an amount of greater than or equal to about 0.1 wt % and less than or equal to about 7 wt %, low temperature performance and output may be improved by suppressing a decomposition reaction of an electrolyte solution at a negative electrode and thus lowering initial resistance and suppressing a decomposition of a solvent. For example, maintaining the amount of the additive at about 0.1 wt % or greater may help ensure that an effect of protecting the negative electrode is not deteriorated. Maintaining the amount at about 7 wt % or less may help ensure that ion conductivity of an electrolyte is not decreased and cycle-life performance is not deteriorated.

In an implementation, the second additive may be included in the electrolyte in an amount of about 0.1 wt % to about 10 wt %, e.g., about 0.5 wt % to about 7 wt %, based on the total weight of the electrolyte. When the second additive is included in an amount of greater than or equal to about 0.1 wt %, a $LiPF_6$ hydrolysis may be advantageously suppressed, and when the amount is less than or equal to about 10 wt %, an oxidative decomposition may be advantageously suppressed through a film formation on the positive electrode.

In an implementation, the first additive and the second additive may be included in the electrolyte in a weight ratio of about 3:1 to 1:3, e.g., about 1:1 to 1:2. In an implementation, the second additive may be included in the electrolyte in an amount that is greater than an amount of the first additive. When the mixing ratio of the first and second additives satisfies the range, e.g., the first additive is used in an amount range of less than or equal to about 3 times or greater than or equal to about ⅓ as much as the second additive weight, a side reaction may be reduced, excellent coating characteristics are obtained, and a resistance increase rate may be improved during repeated cycles or a storage due to improved safety at a high temperature.

The non-aqueous organic solvent serves as a medium for transmitting ions taking part in the electrochemical reaction of a rechargeable lithium battery.

In an implementation, the non-aqueous organic solvent may include a carbonate-based, ester-based, ether-based, ketone-based, alcohol-based, or aprotic solvent. The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. The ether based solvent may include dibutyl ether, tetraglyme, diglyme, dimethoxyethane, 2-methyltetrahydrofuran, tetrahydrofuran, and the like, and the ketone based solvent may include cyclohexanone, and the like. The alcohol based solvent may include ethanol, isopropyl alcohol, and the like, and the aprotic solvent may include nitriles such as R—CN (R is a C2 to C20 linear, branched, or cyclic hydrocarbon group, or may include a double bond, an aromatic ring, or an ether bond), and the like, amides such as dimethyl formamide, and the like, dioxolanes such as 1,3-dioxolane, o the like, sulfolanes, and the like. For example, the solvent may be different from the first and second additives.

The non-aqueous organic solvent may be used alone or in a mixture. When the organic solvent is used in a mixture, the mixture ratio may be controlled in accordance with a desirable battery performance.

When the non-aqueous organic solvent is used in a mixture, a mixed solvent of cyclic carbonate and linear (chain) carbonate; a mixed solvent of cyclic carbonate and a propionate based solvent; or a mixed solvent of cyclic carbonate, linear carbonate, and a propionate based solvent. The propionate based solvent may be methylpropionate, ethylpropionate, propylpropionate, or a combination thereof.

Herein, when the cyclic carbonate and the linear carbonate or the cyclic carbonate and the propionate based solvent are mixed, they may be mixed in a volume ratio of about 1:1 to about 1:9 and thus performance of an electrolyte solution may be improved. In addition, when the cyclic carbonate, the linear carbonate, and the propionate based solvent are mixed, they may be mixed in a volume ratio of about 1:1:1 to about 3:3:4. The mixing ratios of the solvents may be appropriately adjusted according to desirable properties.

In an implementation, the non-aqueous organic solvent may further include an aromatic hydrocarbon-based organic solvent in addition to the carbonate based solvent. For example, the carbonate based solvent and the aromatic hydrocarbon-based organic solvent may be mixed in a volume ratio of about 1:1 to about 30:1.

The aromatic hydrocarbon-based organic solvent may be an aromatic hydrocarbon-based compound of Chemical Formula 8.

[Chemical Formula 8]

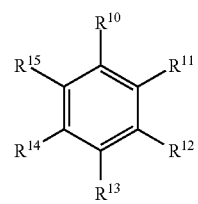

In Chemical Formula 8, $R^{10}$ to $R^{15}$ may each independently be, e.g., hydrogen, a halogen, a C1 to C10 alkyl group, a haloalkyl group, or a combination thereof.

Examples of the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

In an implementation, the non-aqueous electrolyte may further include an additive of vinylene carbonate or an ethylene carbonate-based compound represented by Chemical Formula 9 to help improve cycle life.

[Chemical Formula 9]

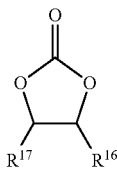

In Chemical Formula 9, $R^{16}$ and $R^{17}$ may each independently be, e.g., hydrogen, a halogen, a cyano group (CN), a nitro group ($NO_2$), or a fluorinated C11 to C5 alkyl group, provided that at least one of $R^{16}$ and $R^{17}$ is a halogen, a cyano group (CN), a cyano group (CN), a nitro group ($NO_2$), or a fluorinated C11 to C5 alkyl group, and $R^{16}$ and $R^{17}$ are not simultaneously hydrogen.

Examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle life may be flexibly used within an appropriate range.

The lithium salt dissolved in an organic solvent supplies a battery with lithium ions, basically operates the rechargeable lithium battery, and improves transportation of the lithium ions between positive and negative electrodes. Examples of the lithium salt may include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers, e.g., an integer of 1 to 20), LiCl, LiI, and $LiB(C_2O_4)_2$ (lithium bis(oxalato) borate; LiBOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

Next, the positive electrode 10 is described.

The positive electrode 10 may include a positive active material layer on a positive current collector. The positive active material layer may include a positive active material and the positive active material may include the positive active material for a rechargeable lithium battery according to an embodiment.

In an implementation, the positive active material may include a compound including, e.g., about 70 mol % or greater of Ni based on the total mole number of all metal elements except for Li.

In an implementation, the compound including about 70 mol % or greater of Ni may be represented by Chemical Formula 7.

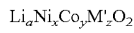   [Chemical Formula 7]

In Chemical Formula 7, 0.9≤a≤1.1, 0.7≤x≤0.98, 0<y≤0.3, 0<z≤0.3, x+y+z=1. M' may be, e.g., Mn or Al.

The compound represented by Chemical Formula 7 may include nickel in a high amount, e.g., x may be in a range of about 0.7 to about 0.98. In this way, when a positive active material including the compound including nickel in a high amount is used, a rechargeable lithium battery having high-capacity may be obtained. For example, when the compound including nickel in a high amount is used in a rechargeable lithium battery, a rechargeable lithium battery having very high capacity may be realized, compared to a compound including nickel in a low amount, e.g., x is less than about 0.7, is used as a positive active material for a rechargeable lithium battery.

The compound represented by Chemical Formula 7 may be, e.g., prepared as a mixture of a lithium-containing compound, a nickel-containing compound, a cobalt-containing compound, and a M'-containing compound.

The lithium-containing compound may include, e.g., lithium acetate, lithium nitrate, lithium hydroxide, lithium carbonate, a hydrate thereof, or a combination thereof. The nickel-containing compound may include, e.g., nickel nitrate, nickel hydroxide, nickel carbonate, nickel acetate, nickel sulfate, a hydrate thereof, or a combination thereof. The cobalt-containing compound may include, e.g., cobalt nitrate, cobalt hydroxide, cobalt carbonate, cobalt acetate, cobalt sulfate, a hydrate thereof, or a combination thereof. The M'-containing compound may include, e.g., M'-containing nitrate, M'-containing hydroxide, M'-containing carbonate, M'-containing acetate, M'-containing sulfate, a hydrate thereof, or a combination thereof. Herein, a mixing ratio of the lithium-containing compound, the nickel-containing compound, the cobalt-containing compound, and the M'-containing compound may be appropriately adjusted to obtain the compound of Chemical Formula 7.

In an implementation, the positive active material may be included in an amount of about 90 wt % to about 98 wt % based on the total weight of the positive active material layer in the positive active material layer.

In an implementation, a positive active material including at least two kinds of compounds represented by each different Chemical Formula may be used. For example, a positive active material including a compound including Ni, Co, and Mn and a compound including Ni, Co, and Al may be applied. In an implementation, the positive active material prepared by mixing a compound including no nickel and a compound including Ni, Co, and Mn, or a compound including Ni, Co, and Al may be applied.

Herein, when one of the at least two kinds of compounds are, e.g., a compound represented by Chemical Formula 7, the compound represented by Chemical Formula 7 may be included in an amount of about 30 wt % to about 97 wt % based on a total amount of the positive active material.

In an implementation, the positive active material layer may include a binder and a conductive material. In an implementation, the binder and the conductive material may be included in an amount of about 1 wt % to about 5 wt %, respectively based on the total amount of the positive active material layer.

The binder may help improve binding properties of positive active material particles with one another and with a current collector. Examples of the binder may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material may be included to provide electrode conductivity. A suitable electrically conductive material that does not cause a chemical change may be used as a conductive material. Examples of the conductive material may include a carbon-based material such as natural graphite, artificial graphite, carbon black, acetylene black, ketjen black, a carbon fiber, and the like; a metal material of a metal powder or a metal fiber including copper, nickel, aluminum, silver, or the like; a conductive polymer such as a polyphenylene derivative; or a mixture thereof.

In an implementation, the positive current collector may include, e.g., an aluminum foil, a nickel foil, or a combination thereof.

The negative electrode 20 may include a negative current collector and a negative active material layer positioned on the current collector. The negative active material layer may include a negative active material.

The negative active material may include a material that reversibly intercalates/deintercalates lithium ions, a lithium metal, a lithium metal alloy, a material being capable of doping/dedoping lithium, or a transition metal oxide.

The material that can reversibly intercalate/deintercalate lithium ions may include, e.g., a carbon material. The carbon material may be a suitable carbon-based negative active material for a rechargeable lithium battery. Examples of the carbon-based negative active material may include crystalline carbon, amorphous carbon, or mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

The lithium metal alloy may include an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be a silicon-based material, e.g., Si, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), a Si-carbon composite, Sn, $SnO_2$, Sn—R (wherein R is an element selected from an alkali metal, an alkaline-earth metal, a Group 13 element, a Group 14 element, a Group 15 element, a Group 16 element, a transition metal, a rare earth element, and a combination thereof, and not Sn), a Sn-carbon composite, and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

In an implementation, the transition metal oxide may include, e.g., lithium titanium oxide.

In the negative active material layer, the negative active material may be included in an amount of, e.g., about 95 wt % to about 99 wt % based on the total weight of the negative active material layer.

In an implementation, the negative active material may be, e.g., a silicon-carbon composite including crystalline carbon and a silicon particle. Herein, an average diameter (D50) of the silicon particle included in the silicon-carbon composite may range from about 10 nm to about 200 nm. In addition, the silicon-carbon composite may include an amorphous carbon layer on at least one surface thereof. As used herein, when a definition is not otherwise provided, an average diameter (D50) of a particle indicates a diameter of a particle where an accumulated volume is about 50 volume % in a particle distribution.

In an implementation, the negative active material may include two or more kinds of the negative active materials. For example, a silicon-carbon composite as a first negative active material and crystalline carbon as a second negative active material may be included.

When the negative active material is prepared by mixing at least two kinds of negative active materials, a mixing ratio thereof may be appropriately adjusted, e.g., an amount of Si may be adjusted in a range of about 3 wt % to about 50 wt % based on the total weight of the negative active material.

In an implementation, when at least two kinds of negative active materials are used, a second negative active material layer including the second negative active material may be formed on a first negative active material layer including the first negative active material. In an implementation, the first and second negative active materials may be mixed in an appropriate ratio to form one negative active material layer.

In an implementation, the negative active material layer may include a negative active material and a binder, and optionally a conductive material.

In the negative active material layer, the negative active material may be included in an amount of, e.g., about 95 wt % to about 99 wt % based on the total weight of the negative active material layer. In the negative active material layer, a content of the binder may be, e.g., about 1 wt % to about 5 wt % based on the total weight of the negative active material layer. When the negative active material layer includes a conductive material, the negative active material layer may include, e.g., about 90 wt % to about 98 wt % of the negative active material, about 1 wt % to about 5 wt % of the binder, and about 1 wt % to about 5 wt % of the conductive material.

The binder improves binding properties of negative active material particles with one another and with a current collector. The binder includes a non-water-soluble binder, a water-soluble binder, or a combination thereof.

The non-water-soluble binder may include, e.g., polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

In an implementation, the water-soluble binder may be a styrene-butadiene rubber, an acrylated styrene-butadiene rubber, a polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity as a thickener. The cellulose-based compound includes one or more of carboxylmethyl cellulose, hydroxypropylmethyl cellulose, methyl cellulose, or alkali metal salts thereof. The alkali metals may be Na, K, or Li. The thickener may be included in an amount of about 0.1 parts to about 3 parts by weight based on 100 parts by weight of the negative active material.

The conductive material is included to provide electrode conductivity. A suitable electrically conductive material may be used as a conductive material unless it causes a chemical change. Examples of the conductive material include a carbon-based material such as natural graphite, artificial graphite, carbon black, acetylene black, ketjen black, denka black, carbon fiber, and the like; a metal-based material of a metal powder or a metal fiber including copper, nickel, aluminum silver, and the like; a conductive polymer such as a polyphenylene derivative; or a mixture thereof.

In an implementation, the negative current collector may include one selected from a copper foil, a nickel foil, a stainless steel foil, a titanium foil, a nickel foam, a copper foam, a polymer substrate coated with a conductive metal, and a combination thereof.

In an implementation, the electrode assembly 40, as shown in the FIGURE, may have a structure obtained by interposing a separator 30 between band-shaped positive electrode 10 and negative electrode 20, spirally winding them, and compressing it into flat. In an implementation, a plurality of quadrangular sheet-shaped positive and negative electrodes may be alternatively stacked with a plurality of separator therebetween.

The separator 30 may be a suitable separator for a lithium battery which can separate a positive electrode 10 and a negative electrode 20 and provide a transporting passage for lithium ions. For example, it may have low resistance to ion transport and excellent impregnation for an electrolyte solution. The separator 30 may be, e.g., selected from a glass fiber, polyester, polyethylene, polypropylene, polytetrafluoroethylene, or a combination thereof. It may have a form of a non-woven fabric or a woven fabric. For example, in a rechargeable lithium battery, a polyolefin-based polymer separator such as polyethylene and polypropylene is mainly used. In order to ensure the heat resistance or mechanical strength, a coated separator including a ceramic component or a polymer material may be used. In an implementation, it may have a mono-layered or multi-layered structure.

As described above, a non-aqueous electrolyte including first and second additives and a positive electrode including a positive active material including a compound including greater than or equal to about 70 mol % of Ni may be used to realize a lithium battery having remarkably improved room temperature and high temperature cycle-life characteristics.

In an implementation, the rechargeable lithium battery may be included in a device. Such a device may include, e.g., one of a mobile phone, a tablet computer, a laptop computer, a power tool, a wearable electronic device, an electric vehicle, a hybrid electric vehicle, a plug-in hybrid electric vehicle, and a power storage device. For example, the device to which the rechargeable lithium battery is applied may be a suitable device.

Hereinafter, the specification will be specifically examined through Examples.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Examples 1 to 9 and Comparative Examples 1 to 7

(1) Preparation of Non-Aqueous Electrolyte

A non-aqueous electrolyte for a rechargeable lithium battery was prepared by adding $LiPF_6$ to a mixed solvent of ethylene carbonate, ethylmethylcarbonate, and dimethyl carbonate (in a volume ratio of 20:40:40) to prepare a 1.15 M solution. Then, first and second additives were added to the solution in amounts shown in Table 1 (based on 100 wt % of the solution).

(2) Manufacture of Rechargeable Lithium Battery Cell

The non-aqueous electrolyte prepared in (1), a positive electrode, and a negative electrode were used to fabricate a cylindrical rechargeable lithium battery in a common method. Herein, 3 g of an electrolyte was injected thereinto.

The positive electrode was fabricated by mixing 96 wt % of a positive active material, 2 wt % of a ketjen black conductive material, and 2 wt % of polyvinylidene fluoride according to a composition shown in Table 1 in an N-methylpyrrolidone solvent to prepare positive active material slurry, coating the positive active material slurry on an aluminum foil, and then, drying and compressing it.

The negative electrode was fabricated by mixing 96 wt % of an artificial graphite negative active material, 2 wt % of a ketjen black conductive material, and 2 wt % of polyvinylidene fluoride in an N-methylpyrrolidone solvent to prepare negative active material slurry, coating the negative active material slurry on a copper foil, and then, drying and compressing it.

Experimental Example 1

Rechargeable lithium batteries according to Examples 1 to 9 and Comparative Examples 1 to 7 were each charged and discharged for 300 cycles at 1 C at ambient temperature (25° C.) and at 45° C., and then, its resistance variation ratio was measured and shown in Table 1.

In addition, the resistance variation ratio was measured by storing the rechargeable lithium battery cells at 60° C. for 30 days and respectively measuring resistance before and after the storage. The results are shown in Table 1.

TABLE 1

| | Positive electrode | First additive (wt %) | | | | Second additive (wt %) | | 25° C. cycle-life resistance variation ratio | 45° C. cycle-life resistance variation ratio | 60° C. storage resistance variation ratio |
|---|---|---|---|---|---|---|---|---|---|---|
| | | TESS | TMSES | EMS | TMSP | LiDFOP | LiBOB | | | |
| Example 1 | Ni84 | 0.5 | | | | 1 | | 26% | 45% | 17% |
| Example 2 | Ni84 | 1 | | | | 1 | | 23% | 38% | 16% |
| Example 3 | Ni84 | | 1 | | | 1 | | 24% | 44% | 19% |
| Example 4 | Ni84 | 1 | | | | | 1 | 25% | 43% | 17% |
| Example 5 | Ni70 | 0.5 | | | | 1 | | 22% | 30% | 15% |
| Example 6 | Ni84 | 2 | | | | 1 | | 21% | 32% | 15% |
| Example 7 | Ni84 | 5 | | | | 1 | | 22% | 33% | 12% |
| Example 8 | Ni84 | | 1 | | | 3 | | 20% | 27% | 16% |
| Example 9 | Ni84 | | 1 | | | 7 | | 22% | 29% | 16% |
| Comparative Example 1 | Ni84 | 0 | | | | 0 | | 64% | 160% | 42% |
| Comparative Example 2 | Ni84 | 0 | | | | 1 | | 46% | 108% | 35% |
| Comparative Example 3 | Ni84 | 1 | | | | 0 | | 57% | 78% | 30% |

TABLE 1-continued

| | Positive electrode | First additive (wt %) | | | | Second additive (wt %) | | 25° C. cycle-life resistance variation ratio | 45° C. cycle-life resistance variation ratio | 60° C. storage resistance variation ratio |
|---|---|---|---|---|---|---|---|---|---|---|
| | | TESS | TMSES | EMS | TMSP | LiDFOP | LiBOB | | | |
| Comparative Example 4 | Ni60 | 0 | | | | 0 | | 30% | 52% | 25% |
| Comparative Example 5 | Ni60 | 0.5 | | | | 1 | | 31% | 54% | 23% |
| Comparative Example 6 | Ni84 | | | 1 | | | 1 | 68% | 200% | 50% |
| Comparative Example 7 | Ni84 | | | | 1 | | 1 | 56% | 120% | 40% |

Table 1 shows a positive electrode composition and each compound marked as first and second additives as follows.

Ni60: $LiNi_{0.6}Co_{0.2}Mn_{0.2}O_2$
Ni70: $LiNi_{0.7}Co_{0.2}Mn_{0.1}O_2$
Ni84: $LiNi_{0.84}Co_{0.11}Al_{0.05}O_2$
TESS: bis(triethylsilyl) sulfate (Chemical Formula 1a)
TMSES: trimethylsilyl ethane sulfonate (Chemical Formula 3a)
EMS: ethyl methane sulfonate
TMSP: Tris(trimethylsilyl)phosphate
LiDFOP: lithium difluoro(bisoxalato) phosphate (Chemical Formula 5a)
LiBOB: lithium bis(oxalato) borate (Chemical Formula 6a).

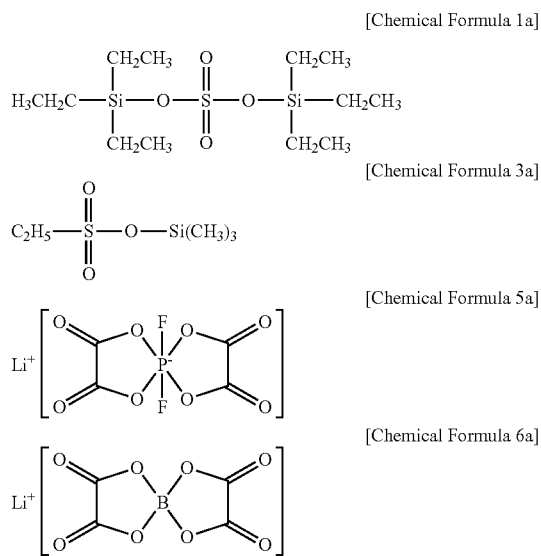

As may be seen in Table 1, the rechargeable lithium battery cells of Examples 1 to 9 (using a nickel-based positive active material including 70 mol % of Ni as a positive active material and an electrolyte including at least one of compounds represented by Chemical Formulas I to 4 as a first additive and at least one of compounds represented by Chemical Formulas 5 to 6 as a second additive) exhibited a low resistance variation ratio at ambient temperature.

A rechargeable lithium battery cell using the same positive active material as used in the Examples but including no first and second additives (e.g., according to Comparative Example 1) or rechargeable lithium battery cells including only one of the first and second additives (e.g., according to Comparative Examples 2 and 3) exhibited a very high resistance variation ratio at ambient temperature, 45° C., and 60° C.

Comparative Example 4 (using an electrolyte including no first and second additives and a positive active material including Ni in a low mole ratio of 60 mol %) and Comparative Example 5 (using the electrolyte including the first and second additives but using the positive active material including Ni in a low mole ratio of 60 mol %) exhibited a higher resistance variation ratio at ambient temperature, 45° C., and 60° C. compared with Examples 1-9.

Comparative Example 6 (using the same positive active material as Example but ethyl methane sulfonate including no Si as a first additive and also including a second additive) and Comparative Example 7 (using a phosphate-based compound as a first additive and also including a second additive) exhibited a much increased resistance variation ratio at ambient temperature, 45° C., and 60° C.

For example, when a nickel-based positive active material including Ni in a high mole ratio of 70 mol % as a positive active material and simultaneously, an electrolyte including at least one among compounds represented by Chemical Formulae 1 to 4 as a first additive and at least one among compounds represented by Chemical Formulae 5 to 6 as a second additive according to Examples 1-9 are used, resistance characteristics at ambient temperature and a high temperature turned out to be much increased.

By way of summation and review, the rechargeable lithium battery may use lithium-transition metal oxide as the positive active material, various carbon-based materials as the negative active material, and an electrolyte prepared by dissolving a lithium salt in a non-aqueous organic solvent. For example, the rechargeable lithium battery may show battery characteristics through a composite reaction between a positive electrode and an electrolyte, a negative electrode and the electrolyte, and the like, and an appropriate combination of the positive and negative active materials and the electrolyte may be considered for improving performance of the rechargeable lithium battery.

The embodiments may provide a rechargeable lithium battery having improved resistance characteristics at ambient (e.g., room) temperature and a high temperature.

DESCRIPTION OF SYMBOLS

100: rechargeable lithium battery
10: positive electrode
20: negative electrode
30: separator
50: case Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable lithium battery, comprising:
a negative electrode;
a positive electrode including a positive active material; and
a non-aqueous electrolyte,
wherein:
the electrolyte includes:
a non-aqueous organic solvent,
a lithium salt,
about 0.5 wt % to about 5 wt % of trimethylsilyl ethane sulfonate, and
about 0.5 wt % to about 7 wt % of lithium difluorobis (oxalato)phosphate, all wt % being based on a total weight of the electrolyte,
the positive active material includes a compound represented by Chemical Formula 7, $$Li_aNi_xCo_yM'_zO_2 \quad \text{[Chemical Formula 7]}$$

in Chemical Formula 7,
0.9≤a≤1.1, 0.8≤x≤0.98, 0<y≤0.3, 0<z≤0.3, x+y+z=1, and M' is Mn or Al.

2. The rechargeable lithium battery as claimed in claim 1, wherein:
the electrolyte includes:
1 wt % of trimethylsilyl methane ethane sulfonate, and
1 wt % to 7 wt % of lithium difluorobis(oxalato) phosphate, and
the positive active material includes $LiNi_{0.84}Co_{0.11}Al_{0.05}O_2$.

* * * * *